(12) United States Patent
Adams et al.

(10) Patent No.: US 6,699,319 B2
(45) Date of Patent: Mar. 2, 2004

(54) PROCESS FOR PREPARING MODIFIED PIGMENTS

(75) Inventors: Curtis E. Adams, Watertown, MA (US); Ronald J. Gambale, Wakefield, MA (US)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 10/140,014

(22) Filed: May 6, 2002

(65) Prior Publication Data

US 2003/0205171 A1 Nov. 6, 2003

(51) Int. Cl.[7] .............................. C09C 1/56; C09B 69/10
(52) U.S. Cl. .................. 106/476; 106/412; 106/493; 106/494; 106/495; 106/496; 106/497; 106/498; 106/499; 106/505; 523/215; 524/495
(58) Field of Search .......................... 106/412, 476, 106/493, 494, 495, 496, 497, 498, 499, 505; 523/215; 524/495

(56) References Cited

U.S. PATENT DOCUMENTS

| | | | |
|---|---|---|---|
| 3,479,300 A | 11/1969 | Rivin et al. | 252/430 |
| 4,014,844 A | 3/1977 | Vidal et al. | 260/31.2 R |
| 4,946,509 A | 8/1990 | Schwartz et al. | 106/496 |
| 5,281,261 A | 1/1994 | Lin | 106/20 R |
| 5,418,277 A | 5/1995 | Ma et al. | 524/520 |
| 5,545,504 A | 8/1996 | Keoshkerian et al. | 430/137 |
| 5,554,739 A | 9/1996 | Belmont | 534/885 |
| 5,571,311 A | 11/1996 | Belmont et al. | 106/20 |
| 5,630,868 A | 5/1997 | Belmont et al. | 106/31.75 |
| 5,698,016 A | 12/1997 | Adams et al. | 106/316 |
| 5,713,988 A | 2/1998 | Belmont et al. | 106/31.6 |
| 5,714,993 A | 2/1998 | Keoshkerian et al. | 347/95 |
| 5,837,045 A | 11/1998 | Johnson et al. | 106/31.85 |
| 5,851,280 A | 12/1998 | Belmont et al. | 106/472 |
| 5,885,335 A | * 3/1999 | Adams et al. | 106/31.6 |
| 5,895,522 A | 4/1999 | Belmont et al. | 106/31.6 |
| 5,900,029 A | 5/1999 | Belmont et al. | 8/550 |
| 5,914,806 A | 6/1999 | Gordon II et al. | 359/296 |
| 5,922,118 A | 7/1999 | Johnson et al. | 106/31.6 |
| 5,952,429 A | 9/1999 | Ikeda et al. | 525/326.1 |
| 5,964,935 A | 10/1999 | Chen et al. | 106/31.65 |
| 5,968,243 A | 10/1999 | Belmont et al. | 106/401 |
| 5,976,233 A | 11/1999 | Osumi et al. | 106/31.75 |
| 6,042,643 A | 3/2000 | Belmont et al. | 106/472 |
| 6,068,688 A | 5/2000 | Whitehouse et al. | 106/31.65 |
| 6,103,380 A | 8/2000 | Devonport | 428/403 |
| 6,110,994 A | * 8/2000 | Cooke et al. | 523/215 |
| 6,150,433 A | 11/2000 | Tsang et al. | 523/160 |
| 6,221,143 B1 | 4/2001 | Palumbo | 106/31.6 |
| 6,221,932 B1 | * 4/2001 | Moffatt et al. | 523/160 |
| 6,235,829 B1 | 5/2001 | Kwan | 524/495 |

FOREIGN PATENT DOCUMENTS

| | | | |
|---|---|---|---|
| EP | 0 677 556 A2 | 10/1995 | C09B/67/08 |
| EP | 0 688 836 A2 | 12/1995 | C09D/11/02 |
| EP | 0 839 883 A2 | 5/1998 | C09D/11/00 |
| GB | 2 330 842 | 5/1999 | C09B/67/54 |
| JP | 57-21466 | 2/1982 | C09D/11/00 |
| JP | 6-128517 | 5/1994 | C09D/11/02 |
| WO | WO 97/47697 | 12/1997 | C09D/11/00 |
| WO | WO 99/23174 | 5/1999 | C09C/1/56 |
| WO | WO 99/31175 | 6/1999 | C08K/9/04 |
| WO | WO 99/38921 | 8/1999 | C09C/1/56 |
| WO | WO 99/51690 | 10/1999 | C09B/69/00 |
| WO | WO 99/63007 | 12/1999 | C09C/1/56 |
| WO | WO 00/05313 | 2/2000 | C09C/3/10 |
| WO | WO 00/22051 | 4/2000 | V09C/1/56 |
| WO | WO 00/43446 | 7/2000 | C08K/9/06 |
| WO | WO 00/52102 | 10/2000 | C09B/67/00 |
| WO | WO 00/68321 | 11/2000 | C09C/3/10 |
| WO | WO 01/25340 | 4/2001 | C09B/67/20 |
| WO | WO 01/51566 | 7/2001 | C09C/3/10 |
| WO | WO 02/04210 | 1/2002 | B41C/1/10 |

OTHER PUBLICATIONS

JP11246806 A to Toyo Ink Mfg. Co. Ltd. Publication Date Sep. 14, 1999 Abstract Only (from Patent Abstracts of Japan).

JP11080636 A to Canon Inc., Publication Date Mar. 26, 1999 Abstract Only (from Patent Abstracts of Japan).

JP11256066 A to Tokai Carbon Co. Ltd., Publication Date Sep. 21, 1999 Abstract Only (from Patent Abstracts of Japan).

* cited by examiner

*Primary Examiner*—Anthony J. Green

(57) ABSTRACT

The present invention relates to a process for preparing a polymer-modified pigment comprising the step of: combining, in any order, at least one pigment having attached at least one nucleophilic group, at least one polymer comprising at least one carboxylic acid group or salt thereof, and at least one coupling agent. At least one mediator compound may also be used. The modified pigments can be used in applications such as inkjet ink applications.

23 Claims, No Drawings

PROCESS FOR PREPARING MODIFIED PIGMENTS

BACKGROUND OF THE INVENTION

1. Field of the Invention

The present invention relates to a process for preparing a polymer-modified pigment comprising the step of: combining, in any order, a pigment having attached at least one nucleophilic group, a polymer comprising at least one carboxylic acid group or salt thereof, and a coupling agent.

2. Description of the Related Art

The surface of pigments contain a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,85 1,280 discloses methods for the attachment of organic groups onto pigments including, for example, attachment via a diazonium reaction wherein the organic group is part of the diazonium salt.

Other methods to prepare modified pigments have also been described. For example, PCT Publication No. WO 01/51566 discloses methods of making a modified pigment by reacting a first chemical group and a second chemical group to form a pigment having attached a third chemical group. Ink compositions containing these pigments are also described.

While these methods provide modified pigments having attached groups, there remains a need for improved processes for attaching groups and, in particular, polymeric groups, to a pigment. These additional methods may provide advantageous alternatives to forming modified pigments.

SUMMARY OF THE INVENTION

The present invention relates to a process for preparing a polymer-modified pigment comprising the step of: combining, in any order, at least one pigment having attached at least one nucleophilic group, at least one polymer comprising at least one carboxylic acid group or salt thereof, and at least one coupling agent. In one embodiment, the polymer and coupling agent are combined to form a reactive polymer, and the reactive polymer is combined with the pigment having attached at least one nucleophilic group. Preferably the process is an aqueous process.

DETAILED DESCRIPTION OF THE INVENTION

The present invention relates to a method for preparing a polymer-modified pigment comprising the step of adding, in any order, at least one pigment having attached at least one nucleophilic group, at least one polymer comprising at least one carboxylic acid group, and at least one coupling agent.

In the process of the present invention, the pigment having attached at least one nucleophilic group may be any pigment having attached any nucleophilic group but is preferably the reaction product of a pigment and a diazonium salt. The diazonium salt comprises the nucleophilic group. In addition, the diazonium salt may comprise a group which may be converted to the nucleophilic group, particularly after reaction with the pigment. Examples of such precursors to nucleophilic groups include nitro and amide groups (both of which can be converted into amine groups) and ketone, aldehyde, and ester groups, from which hydroxy groups can be derived.

The pigment can be any type of pigment conventionally used by those skilled in the art, such as black pigments and other colored pigments. Preferably, when the pigment is a black pigment, the pigment is carbon black. Mixtures of different pigments can also be used. These pigments can also be used in combination with a variety of different types of dispersants in order to form stable dispersions and inks.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal(® 330, Regal® 400, Vulcan® P).

The pigment may also be chosen from a wide range of conventional colored pigments. The colored pigment can be blue, brown, cyan, green, white, violet, magenta, red, orange, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, diketopyrrolo-pyrroles, and (thio)indigoids. Representative examples of phthalocyanine blues include copper phthalocyanine blue and derivatives thereof (Pigment Blue 15). Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The pigment can have a wide range of BET surface areas, as measured by nitrogen adsorption. It is well recognized by those skilled in the art that the pigment may be subject to conventional size reduction or comminution techniques, such as ball or jet milling, to reduce the pigment to a smaller particle size, if desired.

The nucleophilic group of the pigment used in the method of the present invention can be any group capable of forming a polymer-modified pigment when combined with a polymer comprising at least one carboxylic acid group and a coupling agent. Thus, for example, the nucleophilic group may comprise an amine, a hydrazine, an alcohol, a thiol, a hydrazide, an oxime, or salts and derivatives thereof. Preferably the nucleophilic group comprises at least one amine group. Examples of preferred amine groups include those having the formula —$C_6H_4$—ALK—$NH_2$, wherein ALK is a bond or a linear or branched C1–C8 alkyl group. Thus, the amine group may be a phenylene amine group (when ALK is a bond), a benzylene amine group (when ALK is $CH_2$), a phenylene ethylamine group (when ALK is $CH_2CH_2$), or salts thereof. Additional examples of preferred amine groups include groups comprising the formula —SO$_2$—ALK1—NH—ALK2—NH$_2$ group and —SO$_2$—ALK2—NH$_2$, wherein ALK1 is a bond or a linear or branched C1–C8 alkylene group and ALK2 is a linear or branched C1–C8 alkylene group. Thus, the amine group may comprise a —SO$_2$—CH$_2$CH$_2$NH$_2$ group or a —SO$_2$—CH$_2$CH$_2$NH—CH$_2$CH$_2$NH$_2$ group.

The nucleophilic group may also be polymeric. Thus, the nucleophilic group can be a homopolymer or copolymer containing any number of different repeating units which comprise at least one nucleophilic group. Examples of general classes of polymeric groups include, but are not limited to, polyamines, polyethers (such as polyalkyleneoxides), polyols (such as polyhydroxybenzene, polyvinyl alcohol, and acrylic polyols), polymers containing sulfur (such as polysulfide and polyphenylene sulfide), acrylic polymers, polyamides, and polyurethanes. Preferably, the nucleophilic group comprises at least one polyamine group, polyalkylene oxide group, polyol group, polyacid group, or salts or derivatives thereof. Most preferably the nucleophilic group comprises at least one polyamine group or salt thereof. Examples of preferred polyamine groups include linear or branched polyethyleneimine (PEI) groups, polyallylamine groups, polyvinylamine groups, oligomeric groups of ethyleneimine (such as pentaethylenehexamine, PEHA), polyamidoamine groups (such as Starburst(®) dendrimers), or salt or derivatives thereof. Derivatives include these polyamines which have been reacted, at least partially, with acylating agents such as acetic or succinic anhydride.

When the nucleophilic group is polymeric, the nucleophilic group can be a random polymer, alternating polymer, graft polymer, block polymer, star-like polymer, and/or comb-like polymer. It may also comprise multiple nucleophilic groups and therefore may be capable of multiple reactions with the reactive polymer.

The nucleophilic group may also be a polymeric group comprising one or more non-ionic groups. Examples include alkylene oxide groups of from about 1 to about 12 carbons and polyols. Examples of preferred alkylene oxide groups include, but are not limited to, —CH$_2$—CH$_2$—O—; —CH(CH$_3$)—CH$_2$—O—; —CH$_2$—CH(CH$_3$)—O—; —CH$_2$CH$_2$CH$_2$—O—; or combinations thereof. Preferably these non-ionic groups further comprise at least one nucleophilic or electrophilic group, such as an —OH group.

The nucleophilic group may also comprise a group having the formula —X-Sp-[PA]. X, which is directly attached to the pigment, represents an arylene or heteroarylene group or an alkylene group and is substituted with an Sp group, wherein Sp represents a spacer group, and the group PA represents a polyamine group or salt thereof.

The group PA can be any of the polyamines described above. Thus, examples of suitable PA groups include linear or branched polyethyleneimine groups, polyallylamine groups, polyvinylamine groups, oligomeric groups of ethyleneimine, polyamidoamine groups, or salts or derivatives thereof. Derivatives include these polyamines which have been reacted, at least partially, with acylating agents such as acetic or succinic anhydride.

The group Sp represents a spacer group which, as used herein, is a link between two groups. The group Sp can be a bond or a chemical group. Examples of chemical groups include, but are not limited to, —CO$_2$—, —O$_2$C—, —CO—, —OSO$_2$—, —SO$_3$—, —SO$_2$—, —SO$_2$C$_2$H$_4$O—, —SO$_2$C$_2$H$_4$S—, —SO$_2$C$_2$H$_4$NR—, —O—, —S—, —NR—, —NRCO—, —CONR—, —NRCO$_2$—, —O$_2$CNR—, —NRCONR—, —NRCOCH(CH$_2$CO$_2$R)—, —NRCOCH$_2$CH(CO$_2$R)—, —N(COR)CO—, imide groups (including maleimide groups), arylene groups, alkylene groups and the like. R, which can be the same or different, represents hydrogen or an organic group such as a substituted or unsubstituted aryl or alkyl group.

The group X represents an arylene or heteroarylene group or an alkylene group. X is directly attached to the pigment and is further substituted with an Sp group. The aromatic group can be further substituted with any group, such as one or more alkyl groups or aryl groups. Preferably, the arylene group is phenylene, naphthylene, or biphenylene. When X represents an alkylene group, examples include, but are not limited to, substituted or unsubstituted alkylene groups which may be branched or unbranched. The alkylene group can be substituted with one or more groups, such as aromatic groups. Examples include, but are not limited to, $C_1$–$C_{12}$ groups like methylene, ethylene, propylene, or butylene, groups. Preferably, X is an arylene group.

The group X may be substituted with one or more functional groups. Examples of functional groups include, but are not limited to, R', OR', COR', COOR', OCOR', carboxylates, halogens, CN, NR'$_2$, SO$_3$H, sulfonates, sulfates, NR'(COR'), CONR'$_2$, NO$_2$, PO$_3$H$_2$, phosphonates, phosphates, N=NR', SOR', NR'SO$_2$R', and SO$_2$NR'$_2$ wherein R' which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structure above, the group PA is attached to the pigment through the spacer group Sp. In addition, the group PA can also be attached to the pigment at multiple points along the polymer chain through proper choice of substituent groups on the repeating monomer units. These substituents may also comprise spacer groups or —X-Sp- groups as described above. Thus, these groups can be attached to the pigment at either end or at points along the backbone. Further, the group PA can be any type of polymeric group, such as a random polymer, alternating polymer, graft polymer, block polymer, star-like polymer, and/or comb-like polymer.

The pigment having attached at least one nucleophilic group used in the method of the present invention can be prepared using methods known to those skilled in the art. For example, these pigments can be prepared using the methods described in U.S. Pat. Nos. 5,851,280, 5,698,016, 5,922,118, and 5,837,045, and PCT Publication Nos. WO 99/51690 and WO 00/22051, the descriptions of which are fully incorporated herein by reference. These methods provide for a more stable attachment of the groups onto the pigment compared to traditional adsorbed groups, such as polymers, surfactants, and the like.

The pigment having attached at least one nucleophilic group may also be prepared using the method described in PCT Publication No. WO 01/51566, which is incorporated in its entirety herein by reference. Thus, for example, the nucleophilic group may comprise the reaction product of at least one electrophile, such as a (2-sulfatoethyl)-sulphone group or a benzoic acid group, and at least one nucleophilic polymer, such as a polyamine. Other examples are also disclosed in the above-cited reference.

The amount of the nucleophilic groups can be varied. Preferably, the total amount of nucleophilic groups is from about 0.01 to about 10.0 micromoles of organic group/m$^2$ surface area of pigment, as measured by nitrogen adsorption (BET method). For example, the amount of nucleophilic groups can be from about 0.5 to about 4.0 micromoles/m$^2$. Additional attached organic groups which are not reactive with the reactive polymer may also be used.

The pigment having attached at least one nucleophilic group may be purified by washing, such as by filtration, centrifugation, or a combination of the two methods, to remove unreacted raw materials, byproduct salts and other reaction impurities. The pigments may also be isolated, for example, by evaporation or it may be recovered by filtration and drying using known techniques to those skilled in the art.

As stated previously, the process of the present invention comprises the step of: combining, in any order, a pigment having attached at least one nucleophilic group, a polymer comprising at least one carboxylic acid group, and a coupling agent. The polymer may be a homopolymer or copolymer containing any number of different repeating units, any of which comprise at least one carboxylic acid group or salt thereof. The polymer may also have a terminal carboxylic acid group. The polymer may be any type of polymer such as a random polymer, alternating polymer, graft polymer, block polymer, star-like polymer, and/or comb-like polymer. Preferably, the polymer comprising at least one carboxylic acid group is a polyurethane, polyester, polyamide (such as a nylon), or a homo- or copolymer of acrylic acid, methacrylic acid, maleic acid, or salts thereof. Examples of preferred polymers include polyacrylic acid, polymethacrylic acid, poly(styrene-acrylic acid), poly(styrene-methacrylic acid), poly(styrene-maleic acid), copolymers of acrylic acid or methacrylic acid and alkyl acrylates or methacrylates, poly(ethylene-acrylic acid), or salts thereof.

The coupling agent is a material which couples the pigment and the polymer by activating the carboxylic acid groups toward nucleophilic addition. Examples of classes of coupling agents include anhydrides, acyl halides, chloroformates, carbodiimides, triazines containing leaving groups, and carbamoylpyridinium, phosphonium, and uronium salts. Reagents such as dehydrating agents, condensation agents, esterification agents, or amidation agents known to one skilled in the art for activating carboxylic acid groups may also be used. For the present invention, preferred coupling agents are acetic anhydride, diphenylphosphorylazide, 1-ethyl-3-(3-dimethylaminopropyl)carbodiimide (EDAC), 1,3-dicyclohexylcarbodiimide, 1,3-diisopropylcarbodiimide, N,N-carbonyldiimidazole, isobutyl chloroformate, 2-chloro-4,6-dimethoxy-1,3,5-triazine, 4,-(4,6-dimethoxy-1,3,5-triazin-2-yl)-4-methylmorpholinium chloride, 2-(4-dimethylcarbamoyl-pyridino)-ethane-1-sulfonate (such as OB-1207, available from H. W. Sands Corporation), 2-(4-diethylcarbamoyl-pyridino)-ethane-1-sulfonate, O-(N-succinimidyl)-1,1,3,3-tetramethyluronium tetrafluoroborate, benzotriazol-1-yl-oxy-tris-(dimethylamino)-phosphonium hexafluorophosphate, pivaloyl choloride, 1-methyl-2-chloropyridinium iodide, and (4-dimethylcarbamoyl-pyridyl)sulfonate inner salt. Most preferred are those coupling agents which can be used in an aqueous environment and are either soluble in either acidic, neutral, or basic water, or can be dissolved in a water soluble solvent. Examples are EDAC and OB-1207.

In another embodiment of the process of the present invention, the polymer comprising at least one carboxylic acid group is first combined with the coupling agent. The coupling agent and polymer are as described above. In this embodiment, the prior combination of the coupling agent with the polymer activates the carboxylic acid group or salt thereof of the polymer, forming a reactive polymer. The reactive polymer is then combined with the pigment having attached at least one nucleophilic group to form the polymer-modified pigment.

For this embodiment, the process may further comprise the step of adding at least one mediator compound to the reactive polymer. The mediator compound reacts with the reactive polymer to form a polymer which is relatively more stable than the reactive polymer but which is still capable of reacting with the pigment having attached at least one nucleophilic group. The use of a mediator compound is preferred when the reactive polymer reacts readily with the reaction medium. The mediator compound can be any of those known to one skilled in the art for reacting nucleophiles with activated carboxylic acids. For the present invention, preferred mediator compounds are 1-hydroxybenzotriazole (HOBt), N-hydroxysuccinimide (NHS), sodium N-hydroxysulfosuccinimide, 6-phenyl-2-pyridone, and 2-mercaptopyridine.

The process of the present invention can be either aqueous or non-aqueous process. Preferably the process is aqueous. Thus, it is preferred that any one of the components—the pigment having attached at least one nucleophilic group, the polymer comprising at least one carboxylic acid group or salt thereof, the coupling agent, or the mediator (if used)—is soluble or dispersible in water. A water soluble or miscible solvent, such as DMF, may also be used. In addition, the temperature for the process of the present invention is preferably between about 20° C. and 100° C. and is more preferably between about 25° C. and 80° C. Other temperatures can also be used. Thus, it is most preferred that the process of the present invention occurs at or slightly above room temperature. Both the aqueous medium and reaction temperature offer distinct advantages for producing polymer-modified pigments.

The process of the present invention can also be used to prepare modified pigments having more than one attached polymeric group. This can be accomplished, for example, by the use of a pigment having attached more than one type of nucleophilic group. In addition, two different reactive polymers may be used and the amounts adjusted according to the level of available nucleophilic groups. Other combinations will be known to one skilled in the art.

The resulting modified pigments having attached at least one polymeric group can be used in a variety of applications. For example, the modified pigments can be dispersed in a vehicle and used in an ink or coating application. The vehicle can be either an aqueous or non-aqueous vehicle, depending on the nature of the attached organic group. In particular, the modified pigments can be used in an inkjet ink. Suitable additives may be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, dyes, buffers, and the like.

The present invention will be further clarified by the following examples which are intended to be only exemplary in nature.

EXAMPLES

For the following examples, particle size was determined using a Microtrac® Particle Size Analyzer, and the values reported are the mean volume particle size (mV). When used, samples were sonicated using either a Misonix Sonicator 3000 or Misonix XL Sonicator. Percent attached polymer was calculated from thermogravimetric analysis (TGA) using a TA Instruments TGA Model 2950. For TGA analysis, the samples were analyzed under a nitrogen atmosphere according to the following temperature profile (unless otherwise noted): 10° C./min up to 110° C., hold at 110° C. for 10 minutes, continue heating at 10° C./min up to 800° C., and hold at 800° C. for 10 minutes. Percent attached material is determined from comparison of the weight lost between 110° C. and 800° C. of the final product compared to that of the starting materials. The amount of titratable amines (mmol/g) was determined by potentiometric titration of a pigment dispersion with 0.1 N NaOH using a Metrohm 736 GP Titrino Autotitrator. The dispersion was initially adjusted to pH 2 before beginning the titration. Unless stated otherwise, recorded percents are wt % based on the weight of the sample.

Diafiltrations for Example 3 was performed using a Spectrum Minikros module with a 400K MWCO. Diafiltrations for Examples 4 and 5 were performed using a Pall SLP Membrane filtration module with a 13K MWCO. Diafiltrations for Examples 6–9 were performed using a Spectrum Minikros module with a 0.05 μm pore diameter (available from Spectrum Laboratories, Rancho Dominguez, Calif.).

Example 1

A 17% dispersion of Black Pearls® 700 carbon black (available from Cabot Corporation, Boston, Mass.) having attached a 2-(sulfatoethylsulfone) group was prepared according to the procedure described in PCT Publication No. WO 01/51566. The resulting pigment was analyzed for sodium and sulfur content. Results are shown in Table 1 below. From these results, the amount of attached group can be calculated.

TABLE 1

| Na+ (ppm) | Attached groups (mmol/g) | Sulfur (%) | UPA |
|---|---|---|---|
| 6966 | 0.303 | 2.8 | 0.1408 |

Examples 2 and 3

The following general procedure was used to prepare carbon black pigments having attached polyamine groups.

A 10–20% aqueous dispersion of the carbon black of Example 1 was added dropwise at room temperature, over 30–60 min, to a vigorously stirred solution of a polyamine in deionized water. The resulting mixture was stirred for an additional 18–48 hours to yield a dispersion of a pigment having attached a nucleophilic group. This dispersion was acidified with HCl to pH 3–4, sonicated, and then purified by diafiltration using first 10 volumes of 0.1 N HCl, then 10 volumes of deionized water.

For each example, the specific reagents and amounts are shown in Table 2 below.

TABLE 2

| Ex. # | Amount of black dispersion | polyamine | amount of polyamine | amount of water |
|---|---|---|---|---|
| 2 | 15 L @ 17% solids | PEHA | 883.6 g | 2650 mL |
| 3 | 1 L @ 16.8% solids | Ethylenediamine | 50.5 g | 131.5 mL |

Results of the analysis of the pigments having an attached nucleophilic group are shown in Table 3 below.

TABLE 3

| Ex. # | % Solids | PH | % N, dry basis | % S, dry basis | TGA | titratable amine | % polyamine* |
|---|---|---|---|---|---|---|---|
| 2 | 12.09 | 3.7 | 1.59 | 2.07 | 11.50 | — | 3.71 |
| 3 | 11.35 | 3.46 | 0.79 | 2.04 | 8.00 | 0.23 | 1.17 |

*calculated from the increase in % N over that of Black Pearls ® carbon black (found to be 0.25%)

Examples 4–5

Black Pearls® 700 carbon black, 4-aminobenzylamine (ABA), and deionized water were combined in a ProcessAll 4HV Mixer (4 liter). The temperature of the mixture was set to the desired level and mixed at 300 RPM for 10 minutes. A 70% solution of nitric acid was added and mixing was continued for several minutes. To this was added a 20% NaNO$_2$ solution in water over 15 minutes and an additional 50 mL of deionized water. Mixing was continued at the specified temperature for two hours. The contents of the mixer were removed and diluted with deionized water to a concentration of ~15% solids by weight and then purified by centrifugation and diafiltration (10 volumes of 0.1 N HCl, then 5 volumes of deionized water). The resulting product was a dispersion of a pigment having an attached nucleophilic group.

The amounts of reagents and conditions used for each example are found in Table 4 below.

TABLE 4

| Ex. # | Carbon black | ABA | water | reaction temp | 70% HNO$_3$ | 20% NaNO$_2$ | water for dilution | rinse water |
|---|---|---|---|---|---|---|---|---|
| 4 | 500 g | 31 g | 850 g | ambient | 90 g | 86 g | 750 g | 1,350 g |
| 5 | 500 g | 61 g | 850 g | 60–70° C. | 90 g | 173 g | 750 g | 1,350 g |

Properties of these pigments were measured and the results are shown in Table 5 below. Particle size was determined after 5 min sonication.

TABLE 5

| Ex. # | pH | % Solids | Particle size, mV (microns) | Titratable amines | % N |
|---|---|---|---|---|---|
| 4 | 3 | 14.0 | 0.1237 | 0.30 | 0.73 |
| 5 | 2.89 | 12.5 | 0.1379 | 0.35 | 0.80 |

Examples 6A–E

For these examples, a polymer-modified pigment was prepared using the following general procedure. For each example, specific amounts and conditions are shown in Table 6 below.

A solution of a reactive polymer was prepared as follows. A styrene-acrylic acid copolymer (Joncryl® 678 from S. C. Johnson Polymer) having an acid number 215 and Mw of 8,500 was dissolved in dimethylformamide (DMF) to form a 9% solution. A mediator, N-hydroxysuccinimide, was added and stirred to dissolve. A coupling agent, 1-[3-(dimethylamino)propyl]-3-ethylcarbodiimide hydrochloride (EDAC), was added to this mixture and stirred at the selected temperature.

The dispersion of pigment from Example 2 was diluted to 12–15% solids. This was then treated with 1 N NaOH to a pH of 8–9, and then brought to the selected coupling temperature.

The reactive polymer solution in DMF was added over 30 min to the black dispersion with mechanical stirring. Stirring at this temperature was continued for 18–24 hours, resulting in the formation of a polymer-modified pigment. Unreacted polymer and by-products were removed by diluting the reaction mixture with 1 N NaOH and diafiltering with 30 volumes of 0.1 N NaOH, followed by 10 volumes of deionized water.

Properties of the resulting polymer-modified pigment dispersion are shown in Table 6 below.

TABLE 6

| Example # | 6A | 6B | 6C | 6D | 6E |
|---|---|---|---|---|---|
| amount polymer, g | 32.3 | 24.0 | 32.3 | 32.3 | 32.3 |
| amount DMF, g | 323 | 240 | 323 | 323 | 323 |
| amount NHS, g | 1.32 | 0.33 | 0.44 | 1.32 | 0.44 |
| amount EDAC, g | 2.19 | 0.56 | 2.19 | 0.73 | 0.73 |
| activation temperature, °C. | 70 | 25 | 25 | 25 | 70 |
| activation time, hours | 1 | 1 | 24 | 24 | 24 |

TABLE 6-continued

| Example # | 6A | 6B | 6C | 6D | 6E |
|---|---|---|---|---|---|
| volume carbon black dispersion, mL | 165.4 | 128.4 | 165.4 | 165.4 | 165.5 |
| % solids of dispersion | 12.09 | 15.5 | 12.09 | 12.09 | 12.09 |
| coupling temperature, °C. | 70 | 25 | 25 | 70 | 70 |
| particle size, microns | 0.195 | 0.138 | 0.177 | 0.157 | 0.165 |
| % polymer | 21.9 | 12.1 | 22.0 | 16.2 | 19.9 |

These results show that a polymer-modified pigment may be prepared by the process of the present invention in a mixed solvent medium over a range of temperatures. The amount of polymer attached can be controlled by temperature and the amount of coupling agent employed.

Examples 7A–H

For these examples, a polymer-modified pigment was prepared using the following general procedure. For each example, specific amounts and conditions are shown in Table 7 below.

A styrene-acrylic acid copolymer (Joncryl® 678 from S. C. Johnson Polymer) having an acid number 215 and Mw of 8,500 was dissolved in deionized water and neutralized with one equivalent of sodium hydroxide to make a 9% solution. The dispersion of pigment of Example 2 (at 12.09% solids) was added to this polymer solution over 30–60 min to the polymer solution with rapid stirring. The pH of the mixture was adjusted to 9 with aqueous NaOH or HCl, and the temperature was adjusted to the selected value. To this, a 50% solution of 2-(4-dimethylcarbamoyl-pyridino)-ethane-1-sulfonate (OB1207) was added, and stirred for the selected time at the selected temperature to produce a polymer-modified pigment. Unattached polymer and by-products were removed by diluting to 5% total solids with deionized water and diafiltering using first 30 volumes of 0.1 N NaOH, then 10 volumes of water.

Properties of the resulting polymer-modified pigment dispersion are shown in Table 7 below.

TABLE 7

| Example # | 7A | 7B | 7C | 7D | 7E | 7F | 7G | 7H |
|---|---|---|---|---|---|---|---|---|
| amount polymer, g | 2.4 | 2.4 | 2.4 | 2.4 | 2.4 | 2.4 | 1.2 | 1.2 |
| amount water, mL | 24 | 24 | 24 | 24 | 24 | 24 | 12 | 12 |
| amount 4M NaOH, g | 2.68 | 2.68 | 2.68 | 2.68 | 2.68 | 2.68 | 1.34 | 1.34 |
| vol. carbon black dispersion, mL | 16.54 | 16.54 | 16.54 | 16.54 | 16.54 | 16.54 | 16.54 | 16.54 |
| amount OB1207, g | 0.365 | 0.365 | 0.365 | 0.365 | 0.146 | 0.146 | 0.182 | 0.1094 |
| reaction temp, °C. | 25 | 25 | 70 | 70 | 70 | 70 | 70 | 70 |
| reaction time, hours | 1 | 24 | 1 | 24 | 1 | 24 | 24 | 24 |
| particle size, microns | 0.385 | 0.142 | 0.196 | 0.165 | 0.166 | 0.159 | 0.180 | 0.167 |
| % polymer | 4.1 | 6.4 | 12.2 | 15.1 | 7.2 | 11.0 | 15.5 | 16.5 |

These results show that a polymer-modified pigment may be prepared by the process of the present invention in an aqueous medium over a range of temperatures. The amount of polymer attached can be controlled by time, temperature, and the amount of reagents employed.

Examples 8A–B

For these examples, a polymer-modified pigment was prepared using the following general procedure. For each example, specific amounts and conditions are shown in Table 8 below. Joncryl® HPD 671 has an acid number 214 and Mw of 17,250. Joncryl® 683 has an acid number 163 and Mw of 8,000. Both are available from S. C. Johnson Polymer.

The selected styrene-acrylic acid copolymer was dissolved in deionized water and neutralized with one equivalent of sodium hydroxide to make a 9% solution. The dispersion of pigment of Example 2 was added over 30–60 min to the polymer solution with rapid stirring. The pH of this solution was adjusted to 9 with aqueous NaOH or HCl. The temperature of this dispersion was adjusted to the selected value, and a 50% solution of 2-(4-dimethylcarbamoyl-pyridino)-ethane-1-sulfonate (OB1207) was added. This dispersion was stirred for the selected time at the selected temperature, producing a polymer-modified pigment. Unattached polymer and by-products were removed by diluting to 5% total solids with deionized water, sonicating for up to 30 minutes to disperse residue, and then diafiltering using first 30 volumes of 0.1 N NaOH, then 10 volumes of water.

Properties of the resulting polymer-modified pigment dispersion are shown in Table 8 below.

TABLE 8

| Example # | 8A | 8B |
|---|---|---|
| polymer type | Joncryl HPD 671 | Joncryl 683 |
| amount polymer, g | 84.5 | 62.0 |
| amount water, mL | 479 | 558.4 |
| NaOH, g | 12.6 | 7.2 |
| volume carbon black dispersion, mL | 485 | 708.9 |
| % solids | 13.4 | 14.3 |
| amount OB1207, g | 3.74 | 9.42 |
| reaction temperature, ° C. | 70 | 70 |
| reaction time, hours | 24 | 24 |
| particle size, microns | 0.156 | 0.148 |
| % polymer* | 15.22 | 16.0 |

*TGA maximum temperature was 700° C.

These results show that a polymer-modified pigment may be prepared by the process of the present invention using polymers with different molecular weights and acid values.

Examples 9A–D

For these examples, a polymer-modified pigment was prepared using the following general procedure. For each example, specific amounts and conditions are shown in Table 9 below.

A styrene-acrylic acid copolymer (Joncryl® 683 from S. C. Johnson Polymer) having an acid number 163 and Mw of 8,000 was dissolved in deionized water and neutralized with one equivalent of sodium hydroxide to make a 9% solution. The selected pigment having an attached nucleophilic group was added over 30–60 min to the polymer solution with rapid stirring. The pH of this solution was adjusted to 9 with aqueous NaOH or HCl. The temperature of this dispersion was adjusted to the selected value, and then a 50% solution of 2-(4-dimethylcarbamoyl-pyridino)-ethane-1-sulfonate (OB1207) was added. This dispersion was stirred for the selected time at the selected temperature, producing a polymer-modified pigment. Unattached polymer and by-products were removed by diluting to 5% total solids with deionized water, sonicating to disperse residue, and diafiltering using first 30 volumes of 0.1 N NaOH, then 10 volumes of water.

Properties of the resulting polymer-modified pigment dispersion are shown in Table 9 below.

TABLE 9

| Example # | 9A | 9B | 9C | 9D |
|---|---|---|---|---|
| pigment dispersion | Example 3 | Example 4 | Example 4 | Example 5 |
| amount polymer, g | 46.0 | 1.8 | 9.0 | 6 |
| amount water, mL | 414 | 16.4 | 82.4 | 55.0 |
| NaOH, g | 5.39 | 0.21 | 1.05 | 0.70 |
| amount of carbon black dispersion, g | 500 | 21.4 | 21.4 | 80 |
| % solids | 11.35 | 14.0 | 14.0 | 12.5 |
| amount OB1207, g | 7.43 | 0.29 | 1.45 | 0.97 |
| reaction temperature, ° C. | 70 | 70 | 70 | 70 |
| reaction time, hours | 24 | 24 | 24 | 24 |
| particle size, microns | 0.130 | 0.157 | 0.134 | 0.133 |
| % polymer* | 14.1 | 13.3* | 16.9* | 14.7* |

*TGA maximum temperature was 700° C.

These results show that polymer-modified pigments may be prepared by the process of the present invention using different pigments having attached at least one nucleophilic group. The amount of polymer attached may be varied by the amount of polymer and coupling agent employed.

What is claimed is:

1. A process for preparing a polymer-modified pigment comprising the step of:
combining, in any order, at least one pigment having attached at least one nucleophilic group, at least one polymer comprising at least one carboxylic acid group or salt thereof, and at least one coupling agent.

2. The process of claim 1, wherein the process is an aqueous process.

3. The process of claim 1, wherein the pigment having attached at least one nucleophilic group comprises the reaction product of a pigment with a diazonium salt comprising the nucleophilic group or a derivative thereof.

4. The process of claim 3, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

5. The process of claim 4, wherein the pigment is carbon black.

6. The process of claim 1, wherein the nucleophilic group comprises at least one amine group or salt thereof.

7. The process of claim 6, wherein the amine group is a —$C_6H_4$—ALK—$NH_2$ group, wherein ALK is a bond or a linear or branched C1–C8 alkyl group.

8. The process of claim 6, wherein the amine group comprises an —$SO_2$—ALK1-NH—ALK2—$NH_2$ group or an —$SO_2$—ALK2—$NH_2$, wherein ALK1 is a bond or a linear or branched C1–C8 alkylene group and ALK2 is a linear or branched C1–C8 alkylene group.

9. The process of claim 6, wherein the nucleophilic group comprises at least one polyamine group or salt thereof.

10. The process of claim 9, wherein the polyamine group is a linear or branched polyethyleneimine group, a polyallylamine group, a polyvinylamine group, a pentaethylenehexamine group, a polyamidoamine group, or a salt or derivative thereof.

11. The process of claim 1, wherein the nucleophilic group comprises a group having the formula X-Sp-[PA], wherein X, which is directly attached to the pigment, represents an arylene, heteroarylene, or alkylene group, Sp represents a spacer group, and PA represents a polyamine group, a salt thereof, or an acyl derivative thereof.

12. The process of claim 11, wherein PA represents a linear or branched polyethyleneimine group, a pentaethylenehexamine group, or a salt or acyl derivative thereof.

13. The process of claim 1, wherein the polymer comprising at least one carboxylic acid group is a polyurethane, a polyester, a polyamide, or a homopolymer or copolymer of acrylic acid, methacrylic acid, maleic acid, or a salt thereof.

14. The process of claim 1, wherein the polymer comprising at least one carboxylic acid group is polyacrylic acid, polymethacrylic acid, poly(styrene-acrylic acid), poly(styrene-methacrylic acid), poly(styrene-maleic acid), copolymers of acrylic acid or methacrylic acid and alkyl acrylates or methacrylates, poly(ethylene-acrylic acid), or salts thereof.

15. The process of claim 1, wherein the coupling agent is water soluble.

16. The process of claim 1, wherein the coupling agent is acetic anhydride, diphenylphosphorylazide, 1-ethyl-3-(3-dimethylaminopropyl)carbodiimide, 1,3-dicyclohexylcarbodiimide, 1,3-diispropylcarbodiimide, N,N-carbonyldiimidazole, isobutyl chloroformate, 2-chloro-4,6-dimethoxy-1,3,5-triazine, 4,-(4,6-dimethoxy-1,3,5-triazin-2-yl)-4-methylmorpholinium chloride, 2-(4-dimethylcarbamoyl-pyridino)-ethane-1-sulfonate, 2-(4-diethylcarbamoyl-pyridino)-ethane-1-sulfonate, O-(N-succinimidyl)-1,1,3,3-tetramethyluronium tetrafluoroborate, benzotriazol-1-yl-oxy-tris-(dimethylamino)-phosphonium hexafluorophosphate, pivaloyl choloride, 1-methyl-2-chloropyridinium iodide, or (4-dimethcarbamoyl-pyridyl)sulfonate inner salt.

17. The process of claim 1, wherein the polymer comprising at least one carboxylic acid group or salt thereof is combined with the coupling agent to form a reactive polymer, and wherein the reactive polymer is combined with the pigment having attached at least one nucleophilic group.

18. The process of claim 17, wherein the polymer comprising at least one carboxylic acid group is a polyurethane, a polyester, a polyamide, or a homopolymer or copolymer of acrylic acid, methacrylic acid, maleic acid, or salts thereof.

19. The process of claim 17, wherein the polymer comprising at least one carboxylic acid group is polyacrylic acid, polymethacrylic acid, poly(styrene-acrylic acid), poly(styrene-methacrylic acid), poly(styrene-maleic acid), copolymers of acrylic acid or methacrylic acid and alkyl acrylates or methacrylates, poly(ethylene-acrylic acid), or salts thereof.

20. The process of claim 17, wherein the coupling agent is water soluble.

21. The process of claim 17, wherein the coupling agent is acetic anhydride, diphenylphosphorylazide, 1-ethyl-3-(3-dimethylaminopropyl)carbodiimide, 1,3-dicyclohexylcarbodiimide, 1,3-diisopropylcarbodiimide, N,N-carbonyldiimidazole, isobutyl chloroformate, 2-chloro-4,6-dimethoxy-1,3.5-triazine, 4,-(4,6-dimethoxy-1,3,5-triazin-2-yl)-4-methylmorpholinium chloride, 2-(4-dimethylcarbamoyl-pyridino)-ethane-1-sulfonate, 2-(4-diethylcarbamoyl-pyridino)-ethane-1-sulfonate, O-(N-succinimidyl)-1,1,3,3-tetramethyl uronium tetrafluoroborate, benzotriazol-1-yl-oxy-tris-(dimethylamino)-phosphonium hexafluorophosphate, pivaloyl choloride, 1-methyl-2-chloropyridinium iodide, or (4-dimethcarbamoyl-pyridyl)sulfonate inner salt.

22. The process of claim 17, further comprising the step of adding at least one mediator compound to the reactive polymer.

23. The process of claim 22, wherein the mediator compound is 1-hydroxybenzotriazole, N-hydroxysuccinimide, sodium N-hydroxysulfosuccinimide, 6-phenyl-2-pyridone, or 2-mercaptopyridine.

* * * * *